(12) United States Patent
Maase

(10) Patent No.: US 9,646,753 B2
(45) Date of Patent: May 9, 2017

(54) APPARATUS WITH A CIRCUIT FOR ACTUATING A MAGNETIC ACTUATOR ARRANGEMENT

(71) Applicant: CONTINENTAL AUTOMOTIVE GMBH, Hannover (DE)

(72) Inventor: Jens Maase, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 156 days.

(21) Appl. No.: 14/729,204

(22) Filed: Jun. 3, 2015

(65) Prior Publication Data

US 2015/0357106 A1 Dec. 10, 2015

(30) Foreign Application Priority Data

Jun. 4, 2014 (DE) .................. 10 2014 210 633

(51) Int. Cl.
| | |
|---|---|
| *H01F 7/06* | (2006.01) |
| *F02D 41/20* | (2006.01) |
| *H02P 25/034* | (2016.01) |
| *F02M 63/00* | (2006.01) |

(52) U.S. Cl.
CPC ............ *H01F 7/064* (2013.01); *F02D 41/20* (2013.01); *H02P 25/034* (2016.02); *F02D 2041/2072* (2013.01); *F02M 63/0064* (2013.01)

(58) Field of Classification Search
CPC ... H01F 7/064; F02D 41/20; F02D 2041/2072
See application file for complete search history.

(56) References Cited

U.S. PATENT DOCUMENTS

| | | | | |
|---|---|---|---|---|
| 7,884,564 B2* | 2/2011 | Huang | ................... | H02P 6/085 318/400.29 |
| 2002/0166541 A1* | 11/2002 | Yamakado | .............. | F02D 41/20 123/490 |
| 2005/0062494 A1 | 3/2005 | Bui et al. | | |

OTHER PUBLICATIONS

Nietz, N. et al., "INA Schiebenockensystem," Schaeffler Kolloquium, 2010, pp. 228-237, No. 16, URL: http://www.schaeffler.com/remotemedien/media/_shared_media/08_media_library/01_publications /schaeffler_2/symposia_1/downloads_11/Schaeffler_Kolloquium_2010_16_de.pdf.

* cited by examiner

*Primary Examiner* — Scott Bauer
(74) *Attorney, Agent, or Firm* — Laurence A. Greenberg; Werner H. Stemer; Ralph E. Locher

(57) ABSTRACT

An apparatus with a circuit arrangement having four actuatable switching elements and three output connections for actuating two magnetic actuator coils. A first switching element is connected between a first supply voltage connection for a high potential of a supply voltage source and a first output connection. A second switching element is connected between the first supply voltage connection and a second output connection. A third switching element is connected between a third output connection and a second supply voltage connection for low potential of the supply voltage source. A fourth switching element is connected between the second output connection and the second supply voltage connection. A magnetic actuator arrangement is electrically connected to the circuit arrangement via lines and includes two magnetic actuator coils and three actuator connections.

1 Claim, 1 Drawing Sheet

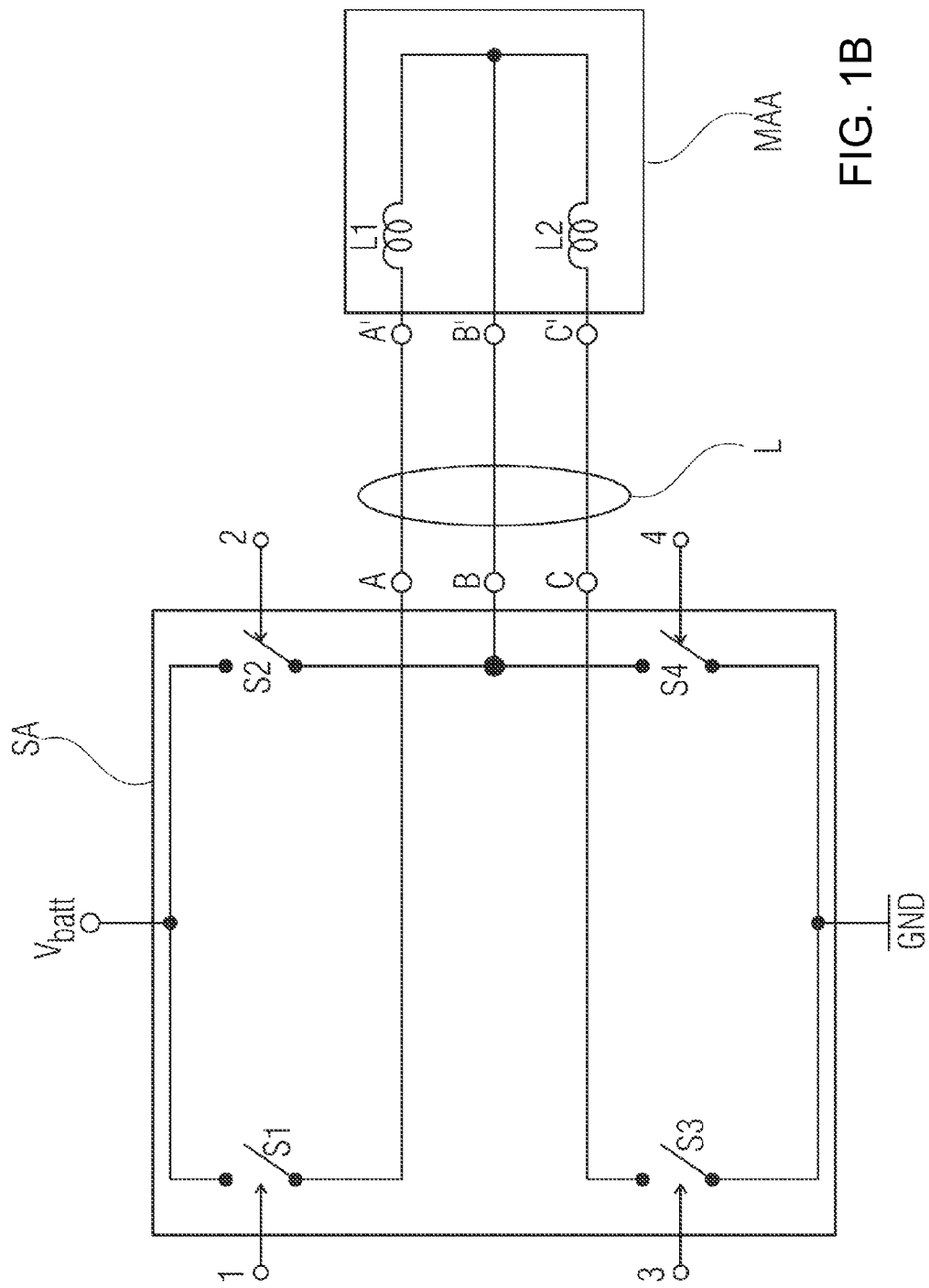

APPARATUS WITH A CIRCUIT FOR ACTUATING A MAGNETIC ACTUATOR ARRANGEMENT

CROSS-REFERENCE TO RELATED APPLICATION

This application claims the priority, under 35 U.S.C. §119, of German patent application DE 10 2014 210 633.8, filed Jun. 4, 2014; the prior application is herewith incorporated by reference in its entirety.

BACKGROUND OF THE INVENTION

Field of the Invention

In automotive electronics, there is often the problem of actuating magnetic drives such as, for example, injection valves or simple plungers by virtue of a voltage being applied to a coil, as a result of which, owing to the resultant current flow, the magnetic field generated thereby exerts a force on a coil armature. If the armature is connected to a valve needle or an actuator plunger, the valve needle or actuator plunger can be moved.

The publication: NIETZ, N. et al., "INA Schiebenockensystem," [INA sliding cam system], No. 16 in the series Schaeffler Kolloquium 2010, pages 228-237 [retrieved on 2014-06-04]. Retrieved from the Internet: <URL: http://www.schaefflercom/remotemedien/media/_shared_media/08_media_library/01_publications/schaeffler_2/symposia_1/downloads_11/Schaeffler_Kolloquium_2010_16_de.pdf> describes a magnetic actuator arrangement, referred to therein as multipin actuator, comprising two plungers (pins) in a housing, which serves the purpose of introducing the plungers optionally into grooves in a sliding cam system in order to move a cam shaft.

In order to actuate magnet coil armatures of such magnetic actuators, the magnet coils are often connected to the high potential of a supply voltage source by means of a first switching element and to the low potential (usually used as reference potential) of the supply voltage source by means of a second switching element. By closing the two switching elements, which takes place by means of corresponding actuation by a control circuit provided for this purpose, a current can flow from the supply voltage source through the magnet coil of the magnetic actuator. In order that the magnetic field that builds up as a result during opening of at least one of the switching elements can decay again, freewheeling circuits which are customary to those of skill in the art are provided.

If two coils are now provided in a housing, which needs to be installed physically remote from a circuit arrangement comprising the switching elements in a vehicle, for example, corresponding connecting lines need to be provided. The connections require space, result in costs and increase the weight of the vehicle. For this, it is necessary to consider that the cable harness of a modern-day vehicle can have a weight of up to 600 newtons and therefore a reduction or at least no further increase in this weight has a high priority.

The lines and the connections need to be tested at preset time intervals for faults such as short circuits with respect to the supply voltage potentials or line interruptions. This is most successful if a dedicated line is routed to each coil connection, but this does mean that, in the case of two coils, four lines need to be provided in a cable harness of a vehicle. In addition, with one line per coil connection, the highest availability of 75% is achieved, which means that, when short circuits occur with respect to the supply voltage potentials, one actuator can still be actuated independently of the other.

Therefore, the coil connections to be connected to the high supply voltage potential are often connected to the high supply voltage potential only via a line and a switching element in the associated circuit arrangement, as a result of which now only three lines are required. However, there is then only a reduced availability of the magnetic actuators in the event of a fault of only 17%. Thus, in the event of a short circuit of the ground-side connection of one actuator, for example, the actuator would still be able to be actuated, but it would also be energized on actuation of the other actuator since both actuators are connected to the high supply potential via the same switching element.

United States patent application US 2005/0062494 A1 describes a circuit arrangement comprising four actuatable switching elements and three output connections (for actuating two magnetic actuator coils), wherein a first switching element is connected between a first supply voltage connection for a high potential of a supply voltage source and a first output connection, a second switching element is connected between the first supply voltage connection and a second output connection, a third switching element is connected between a third output connection and a second supply voltage connection for a low potential of the supply voltage source, and a fourth switching element is connected between the second output connection and the second supply voltage connection.

In the published document, a fifth switching element is also provided, which is connected between the first output connection and the second supply voltage connection, wherein the first to third and fifth switching elements form an H-bridge circuit, with the series circuit comprising two stator coils of a stepper motor being connected in the bridge branch of the H-bridge circuit. The node between the two coils is connected to the second supply voltage connection via the fourth switching element.

SUMMARY OF THE INVENTION

It is accordingly an object of the invention to provide an apparatus with a circuit for actuating a magnetic actuator arrangement which overcomes the above-mentioned and other disadvantages of the heretofore-known devices and methods of this general type and which provides for a circuit arrangement for connecting two coils to a supply voltage source which manages with as few connecting lines as possible and yet provides sufficient failsafety.

With the foregoing and other objects in view there is provided, in accordance with the invention, a circuit configuration, comprising:

a circuit arrangement for actuating a magnetic actuator arrangement, the circuit arrangement including:

four actuatable switching elements including a first switching element, a second switching element, a third switching element, and a fourth switching element;

a first supply voltage connection for a high potential of a supply voltage source and a first output and a second supply voltage connection for a low potential of the supply voltage source;

three output connections including a first output connection, a second output connection, and a third output connection;

wherein:
the first switching element is connected between the first supply voltage connection for the high potential of the supply voltage source and the first output connection;
the second switching element is connected between the first supply voltage connection and the second output connection;
the third switching element is connected between the third output connection and the second supply voltage connection for the low potential of the supply voltage source; and
the fourth switching element is connected between the second output connection and the second supply voltage connection;
a magnetic actuator arrangement electrically connected to the circuit arrangement via lines, the magnetic actuator arrangement including:
a first magnetic actuator coil and a second magnetic actuator coil, a first actuator connection, a second actuator connection, and a third actuator connection;
wherein:
the first magnetic actuator coil is connected between the first and second actuator connections; and
the second magnetic actuator coil is connected between the second and third actuator connections; and
the output connections of the circuit arrangement are connected to the actuator connections to electrically connect the first magnetic actuator coil between the first and second output connections, and to electrically connect the second magnetic actuator coil between the second and third output connections.

In other words, an apparatus according to the invention has a circuit arrangement comprising four actuatable switching elements and three output connections for actuating two magnetic actuator coils, and a first switching element is connected between a first supply voltage connection for a high potential of a supply voltage source and a first output connection, a second switching element is connected between the first supply voltage connection and a second output connection, a third switching element is connected between a third output connection and a second supply voltage connection for a low potential of the supply voltage source, and a fourth switching element is connected between the second output connection and the second supply voltage connection.

Therefore, four further switching elements are provided, which can switch the supply voltage potentials onto only three output connections, however, for actuating two magnetic actuator coils, with the result that, in order to connect to a remote magnetic actuator arrangement, which contains the magnetic actuator coils to be connected to the supply voltage potentials, only three lines are required, wherein greater availability of the magnetic actuators can be ensured than in the case with only three switches.

The apparatus according to the invention has, in addition to the circuit arrangement described, a magnetic actuator arrangement, which is electrically connected to the circuit arrangement via lines and comprises two magnetic actuator coils and three actuator connections, wherein a first magnetic actuator coil is connected between a first and a second actuator connection, and a second magnetic actuator coil is connected between the second and a third actuator connection, and the output connections of the circuit arrangement are connected to the actuator connections in such a way that the first magnetic actuator coil is connected electrically between the first and second output connections, and the second magnetic actuator coil is connected electrically between the second and third output connections.

The magnetic actuator coils are therefore not connected to the potentials of a supply voltage source in each case individually by means of a high-side and a low-side switching element, as in the prior art, but are interconnected quasi in a full-bridge comprising four switching elements, as a result of which, owing to the connection of the two magnetic actuator coils in a bridge branch, advantageously freewheeling circuits can be saved since a freewheeling circuit can be used for both coils.

Other features which are considered as characteristic for the invention are set forth in the appended claims.

Although the invention is illustrated and described herein as embodied in an apparatus comprising a circuit arrangement for actuating a magnetic actuator arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1A is a circuit schematic showing a circuit arrangement according to the invention; and FIG. 1B is a view of a magnetic actuator arrangement comprising two magnetic actuator coils.

DETAILED DESCRIPTION OF THE INVENTION

Referring now to the figures of the drawing in detail and first, particularly, to FIG. 1A thereof, there is shown a circuit arrangement SA comprising four switching elements S1 . . . S4 and three output connections A, B, C. A first switching element S1 is connected between a first connection for a high supply voltage potential $V_{batt}$ and a first output connection A. A second switching element S2 is connected between the first connection for the high supply voltage potential $V_{batt}$ and a second output connection B. A third switching element S3 is connected between a third output connection C and a second connection for the low supply voltage potential GND, which in this case is in the form of reference potential or ground potential. Finally, a fourth switching element S4 is connected between the second output connection B and the second connection for the low supply voltage potential GND.

The four switching elements S1 . . . S4 are actuatable and are actuated via input connections 1, 2, 3 and 4, respectively, to which corresponding control signals or control voltages can be applied. The actuation can take place by means of a control circuit (not illustrated), the design of which is customary to a person skilled in the art. The switching elements S1, . . . S4 can be in the form of any desired electrical, electronic or electromechanical switching elements, but are preferably in the form of MOSFETs.

By virtue of the circuit arrangement SA according to the invention, it is possible to connect the potentials $V_{batt}$, GND of the supply voltage source to the output connections A, B and C, respectively, by corresponding actuation of the switching elements S1, . . . S4. Owing to the use of four switching elements S1 . . . S4 which can only connect potentials to three output connections A, B and C, respectively, however, there is firstly a high availability of magnetic actuator coils to be connected to the output connections A, B, C and at the same time only three lines L are required.

FIG. 1B shows a schematic sketch of a magnetic actuator arrangement MAA with the circuitry of the magnetic actuator coils L1, L2. The magnetic actuator arrangement MAA has three actuator connections A', B' and C', wherein a first magnetic actuator coil L1 is connected between a first actuator connection A' and a second actuator connection B', and a second magnetic actuator coil L2 is connected between the second actuator connection B' and a third actuator connection C'.

Three lines L, which connect the output connections A, B, C of the circuit arrangement SA to the actuator connections A', B' and C', respectively, are illustrated between FIGS. 1a and 1b. By virtue of this connection of the circuit arrangement SA according to the invention to the magnetic actuator arrangement MAA via the lines L, an apparatus according to the invention is provided by means of which the magnetic actuator coils L1 and L2 can optionally be energized by corresponding actuation of the switching elements S1, . . . S4 in order to be able to actuate plungers of a magnetic actuator arrangement for a variable valve drive in this way.

The invention claimed is:

1. A circuit configuration, comprising:
   a circuit arrangement for actuating a magnetic actuator arrangement, the circuit arrangement including:
      four actuatable switching elements including a first switching element, a second switching element, a third switching element, and a fourth switching element;
      a first supply voltage connection for a high potential of a supply voltage source and a first output and a second supply voltage connection for a low potential of the supply voltage source;
      three output connections including a first output connection, a second output connection, and a third output connection;
      wherein:
         said first switching element is connected between said first supply voltage connection for the high potential of the supply voltage source and said first output connection;
         said second switching element is connected between said first supply voltage connection and said second output connection;
         said third switching element is connected between said third output connection and said second supply voltage connection for the low potential of the supply voltage source; and
         said fourth switching element is connected between said second output connection and the second supply voltage connection;
   a magnetic actuator arrangement electrically connected to said circuit arrangement via lines, said magnetic actuator arrangement including:
      a first magnetic actuator coil and a second magnetic actuator coil, a first actuator connection, a second actuator connection, and a third actuator connection;
      wherein:
         said first magnetic actuator coil is connected between said first and second actuator connections; and
         said second magnetic actuator coil is connected between said second and third actuator connections; and
   said output connections of said circuit arrangement are connected to said actuator connections to electrically connect said first magnetic actuator coil between said first and second output connections, and to electrically connect said second magnetic actuator coil between said second and third output connections.

* * * * *